Jan. 18, 1955  J. R. BUCK ET AL  2,699,675
TWO-CONDUCTOR SYSTEM FOR MEASURING RATE AND DIRECTION
OF FLOW AND CONDUCTIVITY OF FLUID IN A PASSAGE
Filed March 6, 1950  5 Sheets-Sheet 1

JULIAN R. BUCK
JOHN C. PETREE
INVENTORS

BY Frederick E. Dumoulin
ATTORNEY

JULIAN R. BUCK
JOHN C. PETREE
INVENTORS

Jan. 18, 1955

J. R. BUCK ET AL 2,699,675

TWO-CONDUCTOR SYSTEM FOR MEASURING RATE AND DIRECTION
OF FLOW AND CONDUCTIVITY OF FLUID IN A PASSAGE

Filed March 6, 1950

JULIAN R. BUCK
JOHN C. PETREE
INVENTORS

BY Frederick E. Dumoulin

ATTORNEY

FIG. 14

JULIAN R. BUCK
JOHN C. PETREE
INVENTORS

Jan. 18, 1955

J. R. BUCK ET AL 2,699,675

TWO-CONDUCTOR SYSTEM FOR MEASURING RATE AND DIRECTION
OF FLOW AND CONDUCTIVITY OF FLUID IN A PASSAGE

Filed March 6, 1950

JULIAN R. BUCK
JOHN C. PETREE
INVENTORS

BY Frederick E. Dumonlin
ATTORNEY

United States Patent Office 2,699,675
Patented Jan. 18, 1955

2,699,675

TWO-CONDUCTOR SYSTEM FOR MEASURING RATE AND DIRECTION OF FLOW AND CONDUCTIVITY OF FLUID IN A PASSAGE

Julian R. Buck and John C. Petree, Dallas, Tex., assignors, by mesne assignments, to Socony-Vacuum Oil Company, Incorporated, New York, N. Y., a corporation of New York Application March 6, 1950, Serial No. 147,972

10 Claims. (Cl. 73—155)

This invention relates to operation of two conductor cables having a plurality of utilization devices at one extremity and a source of power at the other and in a more specific aspect relates to the measurement through a two conductor cable of two conditions in a passage such as a well bore.

Well bores, such as oil, water, and gas well bores, may penetrate several horizons or strata at different levels and a number of these horizons or strata may be simultaneously producing fluids to the well bore. Fluids produced to the well bore may be of the same or different character. For example, in an oil well, one horizon may be producing oil to the well bore while another horizon may be producing gas or producing water to the well bore. Further, the well bore may pass through a porous horizon into which a well fluid produced from another horizon will flow with resultant loss of the otherwise recoverable fluid. It is highly important in order to obtain efficient well operation, particularly production, to know the rate and direction of the fluid flow at known points in the well bore and to know the nature of the well fluid, i. e., whether oil or water. From such knowledge, the location of horizons producing undesired fluids to the well bore and the location of horizons into which desired well fluids are flowing can be determined and the proper remedial measures taken. Additionally, it is often highly desirable to know the rate at which various horizons are producing desired fluids to the well bore in order that steps may be taken to obtain most efficient utilization of reservoir energy. Further, in pressure maintenance or secondary recovery operations where fluid is injected into a well, it is important to know which horizons are receiving the fluid and the rate thereof.

It is an object of this invention to provide an apparatus for measuring the rate and direction of fluid flow and for distinguishing between various fluids of different electrical conductivities at any point in a passage, particularly in a well bore. It is a more specific object of this invention to provide an apparatus for surveying an oil well bore hole to determine the rate and direction of fluid flow at any point in the bore hole and to determine whether such fluid is oil or water.

Heretofore, apparatus has been provided for determining the rate and direction of fluid flow in a well bore, and it is possible to measure the electrical conductivity of the fluid in the well bore to determine whether the fluid is oil, water, or other fluid. Further it is known that the rate of fluid flow in a passage, such as a conduit, may be measured by supplying a known amount of heat to the flowing fluid from an electrical heater and determining the increase in temperature of the flowing fluid by such means as an electrical resistance thermometer, the increase in temperature being a measure of the rate of fluid flow. If an instrument having a self-contained recorder is employed to measure fluid flow and to distinguish between oil and water in a well bore, the desired information is not obtained until the instrument is removed from the well bore. On the other hand, if separate conductors leading from the instrument to proper indicating or recording devices on the surface of the ground are employed in order that the desired information may be obtained immediately, a large number of conductors is required which increases the diameter of the cable or cables passing through the well head. Since the force of extrusion acting on a cable at the well head by the well pressure is proportional to the square of the diameter of the cable, the problem of leakage of oil and gas from the orifice in the well head through which the instrument cable or cables pass, with resultant danger of fire and loss of oil and gas, increases with increasing diameter of cable. Accordingly, it is essential that the number of conductors leading to the instrument be at a minimum in order to minimize the diameter of the cable assembly passing through the well head.

It is another object of this invention to provide a two conductor exploring apparatus for measurement of independent conditions in a passage such as a well bore. It is another object of this invention to provide a well fluid surveying apparatus requiring only two conductors within the cable assembly passing through the well head. It is another object of this invention to provide a well fluid surveying instrument requiring a cable of small diameter.

Further objects of the invention will become apparent from the following detailed description thereof read in conjunction with the drawings in which.

In the preferred embodiment of the invention, hereinafter described, means are provided to measure the rate and direction of fluid flow and the conductivity of the fluid in a narrow passage such as a well bore. In this preferred embodiment, we employ, for measuring the rate and direction of fluid flow, apparatus described and claimed in the copending application of Julian R. Buck, Serial No. 147,971, filed March 6, 1950, now Patent No. 2,675,702.

Figure 1:
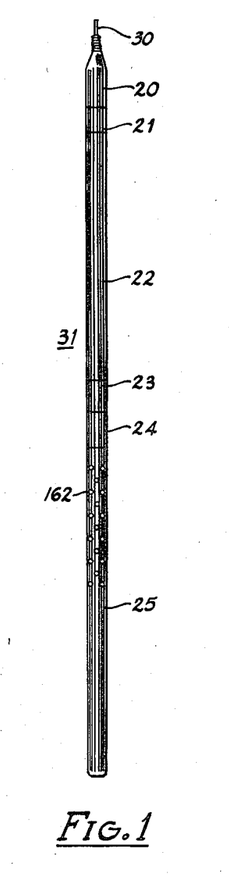
Figure 1 is an elevation of the exploring unit of the instrument of the invention.

Referring now to Figure 1, the exploring unit of the well fluid surveying instrument comprises a socket assembly 20, an upper pressure head 21, an instrument case 22, a lower support 23, a lower pressure head 24, and a sensitive element housing 25. A cable 30 enters the upper portion of the socket assembly. Cable 30 includes a tension or weight supporting member which serves to suspend the unit. The conductors included in cable 30 also lead to the exploring unit. The exploring unit of the well fluid surveying instrument, indicated generally by the numeral 31, may be of any suitable dimensions. However, since the instrument finds particular use in oil well bore holes, the exploring unit must be of sufficiently small cross sectional area to be suspended within the bore hole, or within the casing or tubing of the bore hole, and to interfere with the flow of fluid to the minimum practical extent. In this connection, it will be realized of course, that any unit suspended in the bore hole will interfere with the flow of the fluid to a greater or lesser extent, and complete elimination of interference with the flow of fluid cannot be effected. The unit should also be of such length that it may negotiate any changes in the direction of the well ordinarily encountered.

Figure 2:
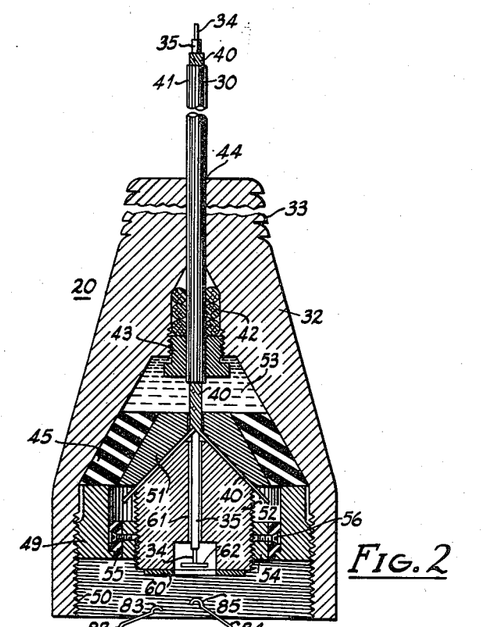
Figure 2 is an elevation in section of the socket assembly of Figure 1.

Referring now to Figure 2, the socket assembly 20 has an outer housing 32. The upper portion of the housing is shaped to provide an anchor 33 to which a fishing tool may readily attach in the event the exploring unit must be fished from the well. If desired, other suitable types of anchors may be employed in conjunction with the socket assembly. The cable 30 enters the socket assembly through the anchor 33 and the socket assembly provides the means for gripping the cable.

Figure 12:
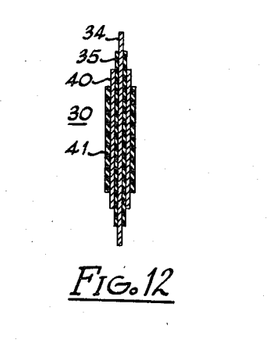
Figure 12 is an elevation in section of a cable for supporting the exploring unit in a well bore and providing the conductors to the unit.

In accordance with one feature of the invention, the present instrument requires only two conductors leading to the exploring unit from the surface. However, ordinary electrical conductors, such as copper conductors, have comparatively low tensile strengths and are not suitable for suspending the exploring unit within the well bore. In the instrument of the invention, there is employed a co-axial suspending cable comprising a steel braid, which provides the required tensile strength to suspend the exploring unit and is used as one of the conductors, and a copper wire, which is used as the second conductor, positioned within and insulated from the steel braid. As shown in Figure 12, the cable has an inner copper conductor 34 surrounded by a layer of insulation 35, which in turn is surrounded by a steel braid 40, and the entire assembly is covered by an outer layer of insulation 41.

Referring again to Figure 2, a spiral packing 42 is held tightly around cable 30 by gland nut 43 to minimize migration of well fluids into the socket assembly through the cable entry port 44. The layer of insulation 41 of cable 30 is extended below the gland nut 43 in order to prevent electrical contact of the steel braid 40 with the outer housing 32. An insulating cone 45 is brought to bear against the inner surface of the housing 32 by means of threaded retainer ring 49 cooperating with threads 50 of the housing 32, and a gripping cone 51 is positioned internally with respect to the cone 45. The steel braid 40 is flared outwardly at its lower end and is gripped tightly between the internal surface of cone 51 and the external surface of a gripping wedge 52 to provide the suspending attachment between the cable and the exploring unit. The wedge 52 is electrically conducting and when contacting the steel braid provides an electrical connection therewith. Oil or other electrical insulating liquid is placed in the space 53 between the cones 45 and 51 and the gland nut 43 in order to further prevent migration of well fluids through the cable entry port 44 with possible electrical contact of wedge 51 with the outer casing 32. Leakage of the insulating liquid downwardly along the walls of the layer of insulation 35 is permissible but will be prevented when the upper pressure head 21 is screwed into the socket assembly thereby providing a pressure seal. A side wall diaphragm (not shown) may be provided in housing 32 to accommodate the differential volume developing from the expansion of the insulating liquid due to well temperatures and the contraction of the liquid due to well pressures under the more extreme conditions encountered in well service. The wedge 52 is threaded externally so that it may be screwed in cooperation with threaded ring 54 against gripping cone 51, and an electrical insulating ring 55 to insulate the gripping cone from the outer housing 32 is interposed between retainer ring 49 and threaded ring 54, and rings 54 and 55 are held together by means of plurality of countersunk screws 56. An electrically conducting contact ring 60 is affixed to the bottom portion of the gripping wedge 52. The layer of insulation 35 and the conductor 34 extend through port 61 in gripping wedge 52, and conductor 34 terminates in contact point 62.

Figure 3:
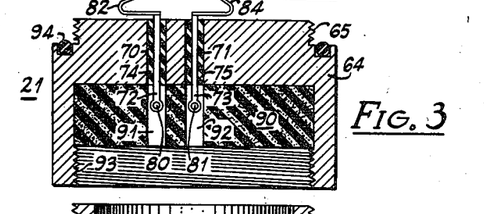
Figure 3 is an elevation in section of the upper pressure head of Figure 1.

Referring to Figure 3, the upper pressure head 21 comprises a body member 64 having threads 65 adapted to cooperate with threads 50 of housing 32 so that the body portion may be screwed into socket assembly 20. Two ports 70 and 71 are provided in the body portion and electrical conductors 72 and 73, respectively, pass through the ports, being insulated from the body member by insulators 74 and 75, respectively, which also form a pressure seal between the conductors and the body members. Conductor 72 is provided with eye terminal 80 and conductor 73 is provided with eye terminal 81. A spring 82 terminating in contactor 83 is electrically connected to the other end of conductor 72 and a similar spring 84 terminating in contactor 85 is electrically connected to conductor 73. A cushion 90 made of a material such as sponge rubber or the like and having ports 91 and 92 is positioned within the body member 64 interiorly of threads 93. The pressure head, upon assembly of the instrument, is screwed into the lower portion of the socket assembly, gasket ring 94 being provided to insure a liquid-tight connection, and contactor 85 will be positioned against contact point 62 and contactor 83 will be positioned against contact ring 60.

Figure 4:
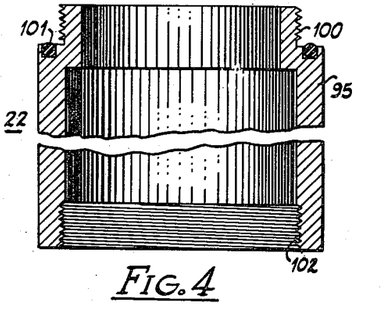
Figure 4 is an elevation in section of the instrument case of Figure 1.

Referring to Figure 4, instrument case 22 comprises a casing 95 having threads 100 adapted to cooperate with threads 93 of the upper presser head 21 so that the casing may be screwed into the upper pressure head, gasket 101 being provided to insure a liquid-tight connection. Threads 102 are provided at the lower portion of the casing.

Figure 5:
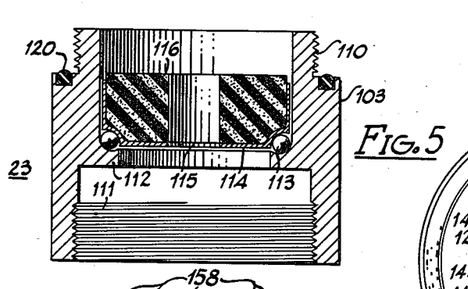
Figure 5 is an elevation in section of a lower support for apparatus to be held within the instrument case of Figure 1.

Lower support 23, referring to Figure 5, serves to support the instrument assembly, hereinafter more fully described, within the instrument case 22. The lower support comprises a casing 103 having threads 110 and 111 and a bearing support section 112, and a plurality of ball bearings 113 are interposed between the bearing support section and cup 114. The cup 114, which has a central port 115, holds a cushion 116 made of sponge rubber or the like and the instrument assembly is supported between this cushion and the cushion 90 of the upper pressure head 21. The lower support screws into the lower portion of the instrument case, gasket 120 being provided to assure a liquid-tight seal, and the cup 114 turns upon the bearings 113 to prevent twisting of the instrument assembly.

Figure 6:
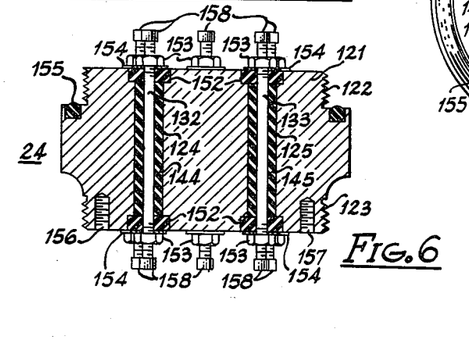
Figure 6 is an elevation in section of the lower pressure head of Figure 1.
Figure 7:
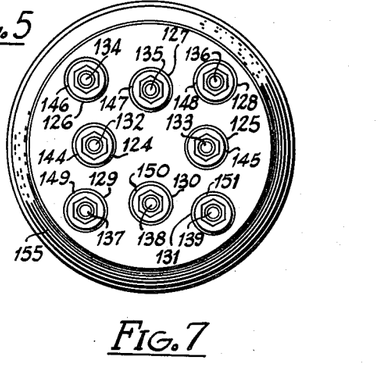
Figure 7 is a top view of the lower pressure head of Figure 6.

The lower pressure head 24, referring to Figures 6 and 7, comprises a body member 121 having threads 122 and 123. The body member is provided with ports 124, 125, 126, 127, 128, 129, 130 and 131 into which are tightly fitted electrical conductors 132, 133, 134, 135, 136, 137, 138 and 139, respectively, surrounded by insulators 144, 145, 146, 147, 148, 149, 150 and 151, respectively. To assure that the lower pressure head is liquid-tight, the ports are countersunk at their upper and lower ends and gaskets 152 are positioned therein. The conductors are threaded at each end to receive bolts 153 which, when tightened against slip rings 154, compress the gasket against the conductors and the insulators. The pressure head 24 screws into the lower support 23, threads 122 being received by threads 111 and gasket 155 is provided to prevent leakage of liquid between the pressure head and the lower support. With the upper and lower pressure heads positioned therein, the instrument case 22 is insulated from the pressure of the surrounding fluids. Bolt holes 156 and 157 are provided in the lower portion of the body member, and electrical contact posts 158 are screwed on both ends of each of the electrical conductors 132 to 139.

Figure 8:
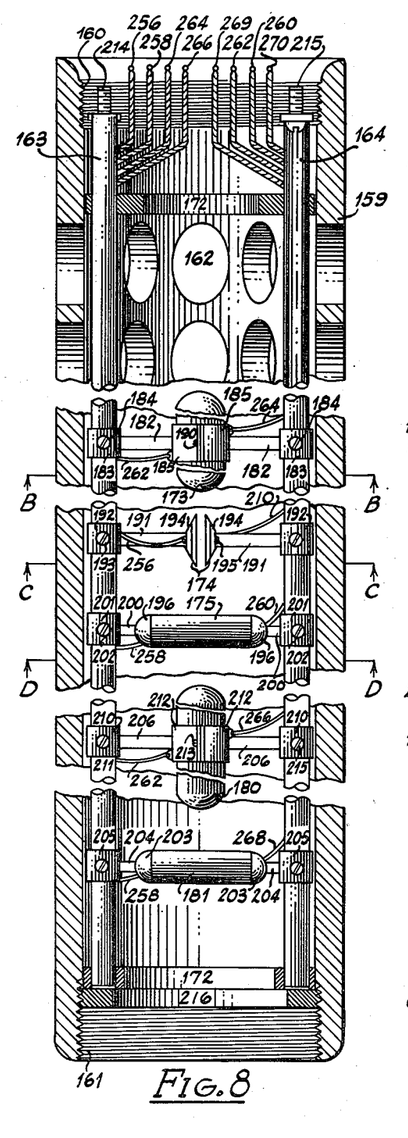
Figure 8 is an elevation in section of the sensitive element housing of Figure 1 and sensitive elements.
Figure 9:
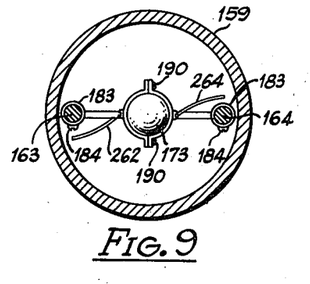
Figure 9 is a horizontal section taken along the line B—B of Figure 8.
Figure 10:
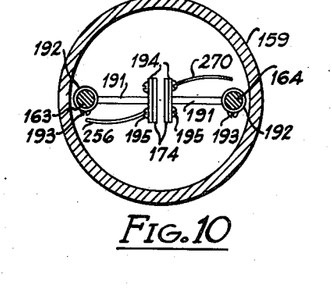
Figure 10 is a horizontal section taken along the line C—C of Figure 8.
Figure 11:
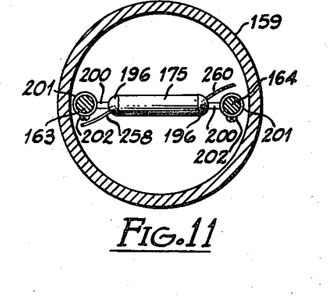
Figure 11 is a horizontal section taken along the line D—D of Figure 8.

The sensitive element housing 25, Figure 8, comprises a casing 159 having threads 160 and 161 and, at the upper end, a plurality of fluid ports 162. The casing fits over rods 163 and 164, and the rods are fitted tightly into a plurality of retainer rings 172 which maintain the rods properly spaced with respect to each other. Rods 163 and 164 support, in fixed, spaced relationship, an electric dummy load heater 173, a pair of conductivity electrodes 174, a temperature sensitive electric resistor 175, an electric heater 180, and another temperature sensitive electric resistor 181. Dummy load heater 173 is supported between the rods 163 and 164 by a pair of arms 182 terminating at one end in sleeves 183 through which the rods pass, screws 184 holding the sleeves to the rods, and terminating at the other end in face plates 185 for holding the heater, the plates being provided with bolts 190. The heater is electrically insulated from the rods 163 and 164, and this is accomplished by making the arms, sleeves, or face plates of electrically insulating material. The dummy load heater is positioned at the upper end of the rods as far as is practical from resistors 175 and 181 in order that the difference in the amount of heat radiated and conducted from this heater upon the two resistors will be negligible with respect to the temperature differential otherwise effected between the two resistors. The conductivity electrodes 174 are supported on the rods by a pair of arms 191 terminating in sleeves 192 through which the rods pass, screws 193 holding the sleeves to the rods, and in face plates 194 to which the electrodes are bolted by means of bolts 195. The temperature sensitive electric resistor 175 is fitted into cups 196 attached to arms 200 terminating in sleeves 201 provided with screws 202, the resistor 175 being electrically insulated from the rods by making the cups, arms or sleeves of electrically insulating material. The temperature sensitive electric resistor 181 is similarly supported between the rods by cups 203 attached to arms 204 terminating in sleeves 205 and is insulated electrically from the rods. Electric heater 180 is supported between rods 163 and 164 in the same manner as the dummy load heater 173 by means of arms 206 terminating in sleeves 210 provided with screws 211 and in face plates 212 provided with bolts 213. Preferably, the temperature sensitive electric resistors 175 and 181 are located equidistant from electric heater 180.

In assembling the exploring unit, the conductivity electrodes, the heaters, and the temperature sensitivity resistors are assembled on the rods 163 and 164, the spacer rings 172 being properly positioned, and the rods bolted by means of bolts 214 and 215 to the lower pressure head 24. In order to prevent short circuiting or cross connecting of the electrodes, heaters, temperature sensitive resistors, and the conductors leading thereto by electrically conducting fluids, these elements are electrically insulated from each other and insulation is assured by coating the elements and connecting leads, but not the faces of the electrodes 174, as by dipping or painting, with a chemically inert, electrically resistant, thermally conductive material, such as a silicone resin. The casing 159 is slipped over the rod assembly and screwed onto the lower pressure head and a retainer ring 216 is then screwed into the lower portion of the casing against the lower spacer ring.

With the well fluid surveying instrument assembled and the exploring unit positioned at a point in a well bore, upward flow of fluid in the well bore will result in fluid passing upwardly within the casing 159 and out through openings 162, passing over heater 180 and temperature sensitive resistors 175 and 181. When heater 180 is operating, the upward flow of fluid will result in an increase in temperature of resistor 175 over resistor 181. With a downward flow of fluid in the well bore, the fluid will enter openings 162 and flow downwardly within the casing 159 and with heater 180 operating, the flow of fluid will result in an increase in temperature of resistor 181 over resistor 175. In each case, the increase in temperature of one resistor over the other will be a function of the rate of flow of the fluid and of the specific heat of the fluid, and by measurement of this temperature differential with knowledge of which resistor is at the higher temperature, the rate and direction of fluid flow can be determined. The fluid, whether flowing upwardly or downwardly, passes over the electrodes 174 and by measurement of the conductivity, the nature of the fluid can be determined. By means of the electrical system, hereinafter described, these measurements are made at the surface of the ground, or other location isolated from the exploring unit, with only two conductors leading to the exploring unit.

Figure 13:
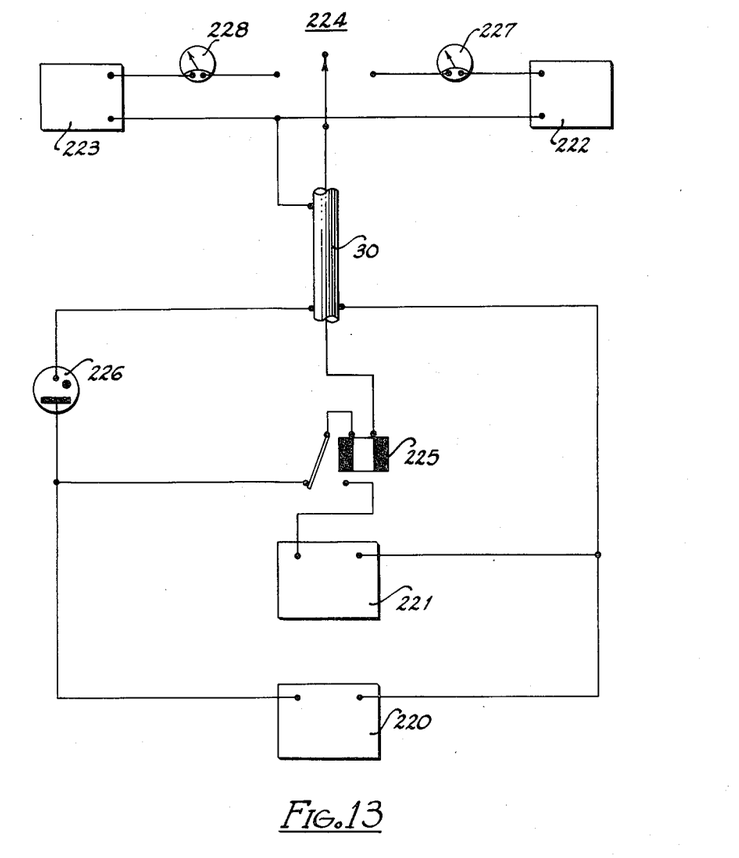
Figure 13 is a simplified diagram of the electrical system of the invention.

The electrical system of the present invention is illustrated in the simplified diagram of Fig. 13 and comprises two detectors 220 and 221 responsive to two independent conditions in a passage and requiring for operation different electrical currents. The detectors 220 and 221 are connected to sources of power 222 and 223 by way of the two conductor cable 30. Detector 220 operates from a source 222 and detector 221 operates from a source 223. As will hereinafter appear, a single source capable of providing different electrical currents may be utilized for operation of both condition responsive devices. However, two sources are utilized herein for purposes of simplifying the present description. Switching means are provided for selectively connecting source 222 or 223 to cable 30. One terminal of each of detectors 220 and 221 is connected to one conductor of cable 30. The other terminals of detectors 220 and 221 are connected to contacts of a relay 225 which is normally biased to close the circuit from cable 30 through detector 220. A gas discharge tube 226 acting as a switching device is connected in series with the coil of relay 225. If source 222 is of potential less than the breakdown potential of tube 226, the current flowing through meter 227, when switch 224 is in the right hand position, may be a function of the condition controlling the detector 220. On the other hand, if the potential of source 223 is greater than the breakdown potential of tube 226, the relay will be actuated placing the detector 221 in circuit with source 223 and the current through meter 228 may be a function of the condition controlling the detector 221. By successively actuating switch 224 to its two circuit-completing positions, the detectors 220 and 221 will be placed in circuit alternately and two conditions may thus be measured.

Generally, the detectors 220 and 221 may be responsive to any of several conditions to be measured within a bore passage. They may operate on different types of current. For example, one device may require alternating current while the other requires direct current, or they may both operate from alternating current or both from direct current. It is required that detector 220 operate with current consumption less than the energizing current of relay 225 and that the current consumption of detector 221 exceeds or is at least equal to the energizing current of relay 225.

As above noted, if the detectors 220 and 221 utilize the same type of current, a single source would replace the two sources 222 and 223. Means would then be provided for varying the output voltage from below to above the firing potential of the gas discharge tube 226.

Figure 14:
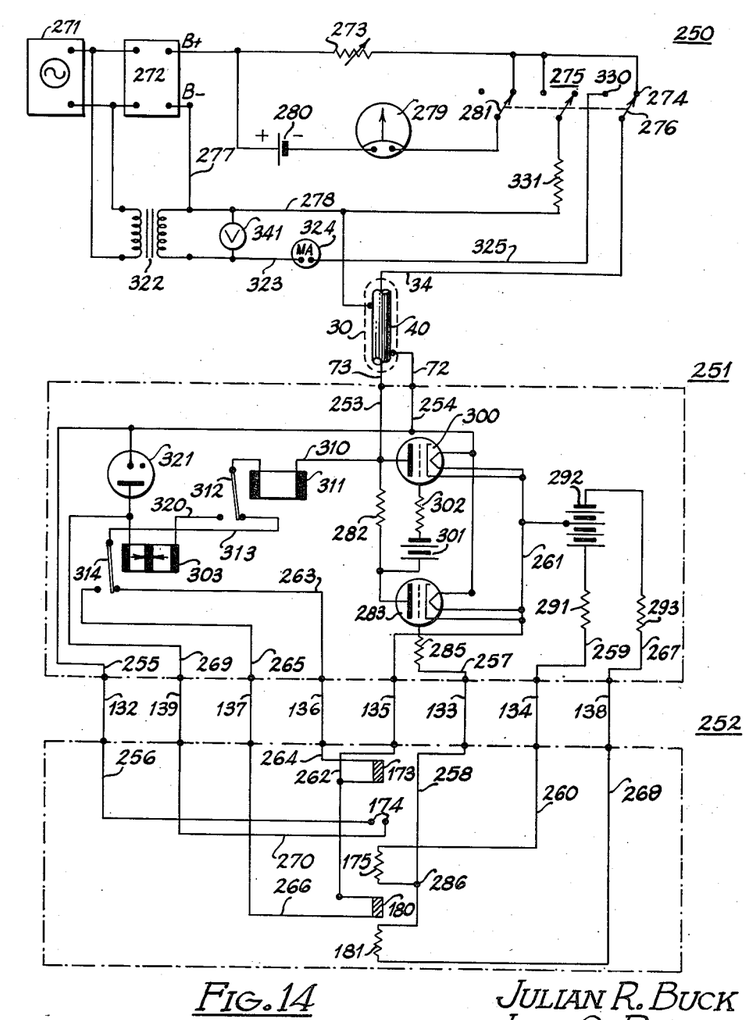
Figure 14 is a more detailed electrical circuit diagram of one embodiment of the invention.

A well fluid surveying instrument embodying the invention is illustrated in detail in Fig. 14, and comprises three units; namely, a power and measuring unit 250 located at the surface of the ground, an amplifier unit 251 which is positioned within the instrument case 22, and a sensitive element unit 252 which is positioned within the sensitive element housing 25 and is made up of the conductivity electrodes 174, the heaters 173 and 180, the temperature sensitive electric resistors 175 and 181, and the connecting leads. The unit 250 includes a source of power and measuring or indicating devices to be hereinafter described. The amplifier unit 251 is coupled to the power and measuring unit 250 by way of the two-conductor cable 30 and the conductors 72 and 73 in the upper pressure head 21, the conductors 72 and 73 being connected respectively to conductors 253 and 254. The sensitive element unit 252 is coupled to the amplifier unit 251 by way of the conductors 132, 133, 134, 135, 136, 137, 138 and 139 in the lower pressure head 24, these conductors being connected respectively to conductors 255 and 256, 257 and 258, 259 and 260, 261 and 262, 263 and 264, 265 and 266, 267 and 268, and 269 and 270.

In order better to understand this embodiment of the present invention, the circuits of the three units will first be described in detail and a description of their operation will then be given.

The power and measuring unit 250, located at the surface of the ground, includes a source of alternating current 271 which may conveniently be an engine driven 60-cycle generator. The source of current 271 is connected to a regulated rectifier or power supply 272 which provides, from the B+ and B— terminals, the plate and filament current for tubes of the amplifier unit 251 and heater current for the sensitive element unit 252. More particularly, the B+ terminal of the rectifier is connected through a variable resistor 273 to the terminal 274 of a triple-pole, double-throw switch 275. As illustrated, the armature 276 of the switch 275, when in the right hand position, connects the B+ terminal of the supply 272 to the central conductor 34 of the cable 30. The negative side, or B— terminal, of the power supply 272 is connected by way of conductor 277 and 278 to the steel braid 40 forming the other conductor of the cable 30. A meter 279 and a battery 280 are connected in series and the series circuit is connected between the B+ terminal of the power supply 272 and contact arm 281 of the switch 275. Thus, the meter and battery are switched in circuit with and parallel to the resistor 273 when the switch armature 276 is connected to terminal 274. The meter 279 is then used to measure to a high degree of accuracy variations in the current flowing through resistor 273.

The variations in the current flowing through resistor 273 are the result of flow of fluids in the sensitive element housing 25 containing the sensitive element unit 252. When suitably calibrated, readings of the meter 279 may be converted into units of rate of flow of well fluids and it is thus that the direct current portion of the measuring system is utilized for the flow measurements.

The direct current flowing in the cable 30 is the sum of two current components. One component is the current required for operation of the amplifier unit 251. The other component is the current required to operate or energize the sensitive element unit 252. Since the units 251 and 252 operate as a single unit electrically and are merely spaced apart physically, they will be, for the sake of convenience, described as a single circuit.

The conductor 34 leading to the exploring unit is connected by way of conductor 253 through a resistor 282 to the anode of an amplifier triode 283. The cathode of the triode 283 is connected to conductor 261 and is thence connected through the filament of the triode 283 to the conductor 254 which in turn is connected through conductor 72 to the steel braid 40 of the cable 30 and forms the return to the B— terminal of the power supply 272. Thus, plate current flows from the anode to the cathode of triode 283 and then back through the filament to the conductor 254 and thence to the surface.

The grid circuit of the amplifier triode 283 includes a series resistor 285 connected through conductors 257, 133 and 258 to a juncture 286 common to the two temperature sensitive resistors 175 and 181. The resistor 175 is then connected by way of conductors 260, 134, and 259 and resistor 291 to the positive terminal of a battery 292 whose center tap is connected to the cathode of triode 283 by way of conductor 261. The negative terminal of battery 292 is connected through resistor 293 and conductors 267, 138 and 268 to the second terminal of resistor 181. Resistors 175 and 181 are selected that upon flow of current from battery 292 therethrough the common juncture 286 will lie at a potential negative with respect to the cathode of triode 283, which negative potential is the operating bias for the amplifier triode 283 and in magnitude is adjusted to fit the requirements of the particular amplifier tube being utilized. Thereafter, if the resistors 175 and 181 are in regions of different temperature, the potential on the grid of the triode 283 will be changed from the operating point in proportion to the change of resistance in the resistors 175 and 181. The resultant change in plate current flowing through the resistor 282 due to the change in grid potential may of itself be used to indicate variations in the flow of fluid passing resistors 175 and 181. However, a more sensitive instrument obtains by adding to the amplifier unit 251 a direct coupled amplifier tube 300 whose cathode is connected to conductor 261 and whose plate is connected directly through conductors 253 and 73 to the conductor 34 of the cable 30. The grid of amplifier tube 300 is directly coupled from the plate of triode 283 through a bias battery 301 and a series grid resistor 302. Thus, changes in the plate current of triode 283 are amplified or augmented by correspondingly greater changes in the plate current of tube 300. The combined plate currents from tubes 283 and 300 are one of the two components of direct current flowing through the surface resistor 273 and are a variable component of the surface current which is proportional to fluid flow through the exploring unit.

The second component of direct current is maintained essentially constant and flows through either the dummy load heater 173 or the heater 180 depending upon the position of ratchet or stepping relay 303. As hereinabove indicated, the dummy load heater 173 is located a considerable distance from the resistors 175 and 181 while the heater 180 is located between and preferably equidistant from them. Thus, when dummy load heater 173 is supplied with current to heat the surrounding fluid, the resistors 175 and 181 may be assumed to be in fluid of uniform temperature since they are remote from heater 173. When heater 180 is turned on, the resistors 175 and 181 may or may not be at the same temperature, depending upon the conditions of flow.

The heating circuit includes cable 30, conductor 310, relay 311, relay armature 312, conductor 313, and relay armature 314. When the dummy load heater 173 is in the heating circuit, current flows from the armature 314 through the conductors 263, 136 and 264 through the heater 173, and thence through the conductors 262, 135 and 261. From conductor 261, the current divides and flows through the filaments of both tubes 283 and 300 to the conductors 254 and 72 and thence to the steel braid conductor 40 of the cable 30. When the stepping relay 311 is actuated to connect the armature 314 of relay 303 to the left-hand relay contact, current flows through conductors 265, 137 and 266 and heater 180 to conductors 262, 135, and 261. Thus, it will be seen that when the switch 275 is in the right-hand position, current flows either through the dummy load heater 173 or the lower heater 180. The stepping relay 311 is spring biased so that armature 312 normally is in contact with the left-hand terminal thereof. The left-hand terminal is connected by way of conductor 320 to the stepping relay 303. The other terminal of relay 303 is connected through a gas discharge tube 321 to the steel braid conductor 40 of the cable 30. The foregoing comprises the direct current or flow measuring circuit of the instrument.

The alternating current circuit is utilized to measure the conductivity of the fluid in the sensitive element housing 25, as will hereinafter be explained. The alternating current portion of the surface unit 250 includes a transformer 322 connected to the output of the source 271 of alternating current. One terminal of the secondary is connected to conductor 278 and thence to the steel braid conductor 40 of cable 30. The other terminal is connected by way of conductor 323 to a milliammeter 324 and thence by way of conductor 325 to terminal 330 of the switch 275. When the switch 275 is in the left-hand position, the alternating current circuit is completed to the conductor 34 in cable 30. At the same time, a load resistor 331 is in circuit with the power supply 272 through the third circuit of switch 275 to take the place of the load presented to the power supply 272 by the well cable and by the elements within the exploring unit, whereby stable operating conditions with respect to the load are maintained at all times.

The alternating current conductivity of the fluid between the two electrodes 174 in the sensitive element housing 25 is measured when switch 275 is in the left-hand position, i. e., when the armature 276 is connected to terminal 330. If the alternating current voltage V indicated by voltmeter 341 at the secondary of the transformer 322 is maintained constant at a selected value, the current flowing through the milliammeter 324 will be inversely proportional to the sum of the known impedances of the cable 30, the relay coils 311 and 303 plus the unknown impedance existing between the electrodes 174. The circuit to the electrodes is completed by the conductors 255, 132, 256, 270, 139 and 269.

The manner in which the measuring system functions will now be described. With the switch 275 in the position illustrated, the tubes 283 and 300 will be conducting, the plate currents being determined by the operating bias. Additionally, when the voltage from the rectifier or direct current source 272 is applied to the cable 30, the relay 311 is energized, moving the armature 312 to the right-hand contact completing the circuit through conductor 313, armature 314, and conductors 263 and 136 to the dummy load heater 173. The measuring circuit at the surface is then calibrated by varying the resistor 273 until the voltage thereacross is exactly equal and opposite to the voltage of the battery 280. At that point, the meter 279 registers zero. The meter 279 preferably has its zero at the center of the scale, permitting it to deflect in either direction to correspond with reversal of current in the meter circuit. After the resistor 273 has been adjusted for a zero reading on the meter 279, switch 275 is moved to the left-hand position to release armature 312 moving it to the left-hand contact. Thereafter, the switch 275 is immediately actuated back to the right-hand position. At the instant the switch closes, the voltage from the rectifier or direct current source 272 is applied across a circuit which includes in series the relay 311, relay 303, and the gas discharge tube 321. By proper selection of the time constants of the relays 311 and 303, they may be actuated in such a manner that the initial surge of current through both relays will perform the function of drawing armature 314 to a new position and propelling armature 312 toward the right-hand contact. As armature 312 begins its excursion, the current circuit is opened but the inertia of the armature 312 is such as to permit a completion of the circuit through the right-hand contact for flow of heating current through the selected heater 173 or 180. Each time the switch 275 is actuated to the right, the rachet or stepping relay 303 alternately moves the armature 314 from one contact to the other. In either position, a closed circuit is maintained. Thus, after actuation of the switch 275, the armature 314 should be in contact with the left-hand terminal of the relay 303 which is connected through conductors 265, 137 and 266 to heater 180. Flow of current through heater 180 raises the temperature of the surrounding fluids. If the flow is upward through the sensitive element housing 25, the temperature of the fluid adjacent to the temperature sensitive resistor 175 is elevated, thus lowering the resistance thereof. This alters the potential at the common juncture 286 and thus changes the grid bias on the triode 283. For the action just described, the grid will go more positive, increasing the plate current in triode 283 which increase also causes a corresponding and amplified decrease in the anode current of tube 300. The plate resistance 282 preferably is very high so that the plate current will be relatively small. The change of voltage across relatively large resistor 282, applied through battery 301 and resistance 302, produces a relatively large change in the plate current of tube 300 which has as its load only the cable 30 and the resistance 273. The difference between the currents from tubes 283 and 300 is the variable measured. The total change in plate currents is then indicated by the deflection of the meter 279.

If the flow of fluid is downward through the sensitive element housing 25, the temperature sensitive resistor 181 will decrease in resistance because of the elevated temperature which will change the potential of point 286 to cause a decrease in the plate current of tube 283 with the corresponding and amplified increase in the plate current of tube 300. By suitably calibrating the system, minute changes in the total plate current will be a direct reading or indication of the rate of fluid flow through the sensitive element in the housing 25 and hence in the well bore. Thereafter, by actuating switch 275 to the left-hand position, the alternating current voltage V measured by voltmeter 341 is applied to the electrodes 174 and the nature of the subsurface fluid may be identified by the value of its conductivity.

The sum of the current flowing through the tubes 283 and 300 and the current flowing through the heater 173 or the heater 180 is equal to the sum of the currents required for heating the parallel connected filaments of tubes 283 and 300.

It will be noted that when the armature 312 is in its left-hand circuit completing position, as viewed in Fig. 14, the electrodes 174 are electrically isolated from the heaters 173 and 180. Since the electrodes 174 in oil well measurements ordinarily operate in high resistive fluids, applicants provide the voltage regulator tube 321 to assure switching operation from the flow measuring system to the conductivity measuring system regardless of the conductivity of the fluids under study. This is accomplished by providing the power supply 272 with a higher output voltage than the firing potential of tube 321. When relays 311 and 303 and the voltage regulator tube 321 are in series, the D. C. voltage will break down the discharge tube 321, changing it from an infinite to a relatively low impedance for passage therethrough of an initial surge of current so that the relay 303 is actuated and 311 similarly is operated to establish a current flow path from the two conductor cable circuit 30 through one or the other of heaters 173 or 180. By this means the dummy load heater may be selectively substituted for the fluid heater 180 adjacent the temperature sensitive elements.

On the other hand, the maximum or peak alternating current voltage is adjusted to be less than the break down voltage of discharge tube 321 so that substantially the full voltage V appears between the electrodes 174. The discharge tube thus serves as a momentary low impedance load or resistance unit for the conduction of direct current to permit desired switching regardless of the character of the fluids between electrodes 174 and yet presents open circuit or infinite impedance to the alternating current designed to pass only between electrodes 174.

Since in the conductivity test, the amplifier filament supply is removed and the tubes are non-conducting, the alternating current path is effectively reduced to a simple circuit in series with the electrodes. As is well understood by those skilled in the art, the conductivity of the fluid between the electrodes may be taken as a function of the ratio of the current flowing through meter 324 and the voltage V.

For most convenient operation of the instrument, the following considerations may be given to the amplifier grid circuit for control of the sensitivity of the well fluid surveying instrument. As has been previously stated, the ratio of the resistance values of resistors 175 and 181 establishes the bias voltage on tube 283. If resistors 291 and 293 in the grid circuit of tube 283 are selected in the same ratio as are the thermally sensitive resistors 175 and 181, then no change in bias voltage results from their mere inclusion in the circuit. If now the relative magnitude of resistors 291 and 293 is varied while maintaining the desired ratio, sensitivity control is obtained. For example, should the resistance of resistors 291 and 293 be taken as zero, then maximum thermal sensitivity is achieved. On the other hand, if the resistance of resistors 291 and 293 is taken proportionately large, then the resistance variations in resistors 175 and 181 with temperature are effectively masked to yield a low sensitivity grid circuit. Through this technique, amplifier tube 300 can be adjusted for operations confined to the favorable portion of its plate current characteristic over a wide range of fluid flow rates.

It is to be observed that the resistors 175 and 181 are exposed to well pressures as well at temperatures. Although the change of resistance is small over the range of pressures of interest, the effect is entirely cancelled as is the ambient temperature effect because of the balanced design of the grid circuit with respect to the tube 283. It is therefore emphasized that only the change in resistance due to a temperature differential between resistors 175 and 181 is capable of affecting the normal bias on tube 283.

Figure 15:
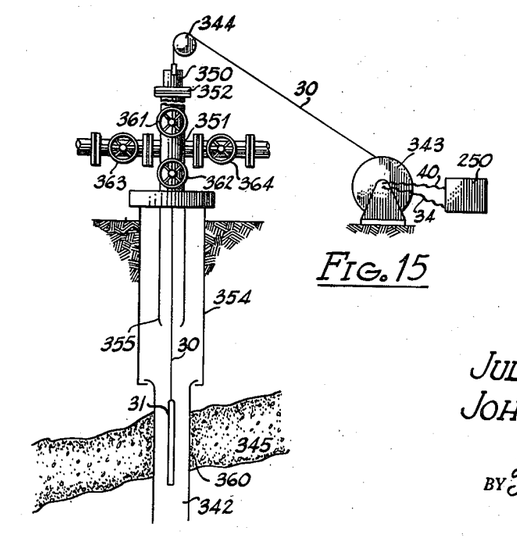
Figure 15 is a schematic diagram illustrating a method of employing the well fluid surveying instrument.

Referring to Figure 15, for measuring the rate and direction of fluid flow and the nature of the fluid at any location within a well bore 342, the exploring unit 31 is suspended within the weld bore and at the desired location by means of cable 30. The cable 30 is wound around drum 343 and passed over pulley 344, and by operation of the drum the unit may be raised or lowered to any location such as horizon 345. By means of slip rings (not shown) on the drum 343, the conductors 34 and 40 are led to the power and measuring unit 250. The cable 30 passes through a lubricator 350 attached to the christmas tree 351 by flanged joint or coupling 352, and the well is provided with casing 354, tubing 355, and liner 360.

With valve 361 on the christmas tree closed and the flanged joint 352 open, the cable 30 is passed through the lubricator 350. The end of the cable is then passed through cable entry port 44 of socket assembly 20 and affixed therein by tightening gripping wedge 52 against gripping cone 51, the steel braid 40 being positioned therebetween. Contact point 62 is attached to the conductor 34 and the upper pressure head is screwed into the socket assembly. Conductors 253 and 254 of unit 251 in the instrument case 22 are connected to conductors 73 and 72 respectively and the instrument case 22 is screwed into the upper pressure head. The eight conductors 255, 257, 259, 261, 263, 265, 267 and 269 from unit 251 in the instrument case 22 are brought out through port 115 in the lower support 23 and connected respectively to the conductors 132, 133, 134, 135, 136, 137, 138 and 139 in the lower pressure head 24. The conductors leading through the port 115 are countertwisted and the lower pressure head is screwed into the lower support 23. Rods 163 and 164 are bolted onto the lower pressure head, the electrodes, heaters, and temperature sensitive electrical resistors being mounted thereon and, with the exception of the electrodes, having been subjected to an electrical insulation coating process. Conductors 132, 133, 134, 135, 136, 137, 138, and 139 are connected to conductors 256, 258, 260, 262, 264, 266, 268, and 270, respectively. The casing 159 is fitted over the rods and the sensitive elements, and retainer ring 216 is screwed into place. The well fluid surveying instrument is placed within the lubricator, the flanged joint 352 is closed, and valve 361 is opened. With valve 362 open, the instrument is then positioned at any point in the well by operation of drum 343, the depth of the instrument being indicated by any suitable type of depth indicator associated with the cable or the drum. Production from the well through either or both of valves 363 and 364 may be continued while the instrument is being admitted to, maneuvered within, or removed from the well.

Operations at the surface to measure the rate and direction of flow and the nature of the fluid within a well bore include the following steps. The exploring unit 31 is positioned at the desired location and with switch 275 in the right-hand position, and after heater 173 has attained equilibrium temperature, resistor 273 is adjusted until meter 279 reads zero which indicates that the current flowing through heater 173 is the value desired for operation as determined by the voltage of the battery 280. When the current is adjusted, switch 275 momentarily is moved to the left-hand position. Immediately thereafter, switch 275 is returned to the right-hand position, placing heater 180 in circuit with conductor 34.

Assuming the flow of fluid to be upward, heat from heater 180 raises the temperatures of the resistor 175, thus decreasing its impedance to unbalance the initially balanced grid circuit of tube 283. The unbalance, amplified, is reflected as a change in the total current supplied by source of direct current 272, which change is readily noted by a corresponding change in the reading of meter 279. For a downward flow of fluid, the temperature of resistor 181 is raised, unbalancing the grid circuit of tube 283 in a sense opposite the effect of upward flow producing an opposite deflection of the meter 279. The direction of flow ascribed to a given meter deflection is, of course, a matter of calibration of the instrument, and additionally, the magnitude of the flow is determined for given fluids upon suitable calibration.

After the above operations are completed, the switch 275 is moved to the left hand position and a measurement of the conductivity is made. It is to be noted that in the left hand switch position the secondary of transformer 322 is in circuit with electrodes 174. By noting the voltage V on meter 341 connected across the terminals of the transformer 322 and the current flowing through the milliammeter 324, the conductivity of the fluid between the electrodes 174 may be calculated. The exploring unit 31 is then moved to other desired measuring locations and the above steps repeated. With knowledge of the direction and magnitude of flow at a number of different locations in the vertical traverse of a well bore, it is possible to locate the points of fluid influx or egress with respect to the well bore. With information as to the electrical conductivity of the fluid stream at each selected location, it further becomes possible to identify the levels or horizons producing brine or producing oil into the well bore.

Having thus described our invention, it is to be understood that such description has been given by way of illustration and example and not by way of limitation, reference for the latter purpose being had to the appended claims.

What is claimed is:

1. In a system having two electrically operated detecting elements each having two terminals spaced from a source of power and interconnected therewith by a two-conductor circuit, the combination which comprises circuit means for connecting one terminals of each of said elements to one of the conductors of said circuit, a normally closed circuit for the first detecting element and including in series relay means and the other of said conductors connected to the other terminal of said first element whose total current requirement is less than the actuating current of said relay, a gas discharge tube connected in parallel with said first element, means at said source for varying the potential in said circuit from below to above the firing potential of said gas discharge tube to energize said relay to connect the other conductor to the other terminal of the second detecting element whereby the second of said detecting elements is substituted for said first element.

2. In a measuring system having two electrically operated detecting elements each having two terminals spaced from a source of power having connected thereto a two-conductor circuit extending to said elements the combination which comprises a normally closed circuit including in series one of said conductors, a first of said elements, a switching means and the other of said conductors, said first element having current requirements normally less than the energizing current of said switching means, a gas discharge tube in circuit with said switching means, and means at said source for varying the potential thereof from below to above the firing potential of said gas discharge tube to actuate said switching means and substitute in said series circuit the second of said elements for said first element and means in circuit with said source for measuring the currents through said two conductor circuit.

3. In a system having two electrically operated elements in a passage each having two terminals and responsive to two conditions therein and a source of power having a two conductor circuit extending into said passage, a control system for completing said circuit to said elements for measurement of either of said conditions comprising a single pole double throw relay connected to one conductor in said circuit adjacent said elements, the energizing current of said relay being greater than the total current for the first of said elements and less than the total current for the second of said elements, means for connecting one terminal of said first element to the normally closed pole of said relay, means for connecting one terminal of said second element to the normally open pole of said relay, circuit means connecting the other terminal of each of said elements to the other conductor in said circuit, a gas discharge tube connected parallel to said first element, and means for varying the potential of said source from below to above the firing potential of said tube for energizing said relay to close said normally open relay circuit through said second element.

4. In a system for measuring respectively the conductivity and the rate and direction of flow of fluids in a bore hole the combination comprising a source of alternating current, means including a two conductor circuit extending from said source into said bore hole, and supporting means, a housing carried by said supporting means and including a flow channel, a relay and a pair of electrodes in said housing connected in series with the extremities of said two conductors, a gas discharge tube connected in parallel to said electrodes and having a firing potential greater than the peak value of the potential of said source, a current flow modifying fluid flow sensitive device in said flow channel connected to one of said conductors and to a normally open terminal of said relay, a source of potential at the surface of magnitude greater than the firing potential of said tube, means at the surface for applying said last named potential to said two conductors to energize said relay and close the circuit through said normally open terminal to substitute said flow responsive device for said electrodes and means adjacent said sources and coupled to said circuit for measuring currents in said two conductor circuit.

5. In a measuring system having a source of power and a two-conductor circuit extending therefrom, the combination which comprises a high electrical impedance detecting element and a low electrical impedance detecting element each of which has two terminals, circuit means for connecting one terminal of each of said elements to the extremity of one of said conductors, a normally closed circuit extending from the second terminal of said high impedance element to the second of said conductors and including in series a relay coil and the armature thereof, a gas discharge tube connected in parallel with said high impedance element, means at said source for varying the potentials applied to said conductors from below to above the firing potential of said discharge tube for actuation of said relay to substitute said low impedance detecting element for said high impedance detecting element, and means in circuit with said source for measuring the currents in said two-conductor circuit at the two potentials.

6. A system for determining conductivity and the rate and direction of flow of fluid in a passage comprising means including a two-conductor circuit extending from a measuring station into said passage and a supporting means, a housing having a flow channel carried by said supporting means, a two terminal flow-responsive device in said flow channel at the extremity of said circuit, a pair of electrodes adjacent said flow-responsive device, circuit means for connecting one terminal of said flow-responsive device and one of said electrodes to one of the conductors in said circuit for controlling current flow in said two conductor circuit in response to fluid flow variations, a normally closed circuit extending from the second of said conductors to the second of said electrodes and to the other terminal of said flow responsive device and including in series a relay coil and the armature thereof, a gas discharge tube connected in parallel with said electrodes, a source of alternating current at said measuring station connected to said two-conductor circuit whose peak potential is less than the firing potential of said gas discharge tube for measurement of the conductivity of said fluid between said electrodes, a source of direct current potential at said measuring station of magnitude greater than the firing potential of said gas discharge tube, and switching means for substituting said direct current source for said alternating current source to actuate said relay upon firing of said gas discharge tube for substitution of said flow-responsive device for said electrodes whereby the currents in said two-conductor circuit are proportional to the conductivity and magnitude of flow of said fluids.

7. In a system having two electrically operated elements in a passage each having two terminals responsive to two conditions therein and a source of power having a two conductor circuit extending into said passage, a control system for completing said circuit to said elements for measurement of either of said conditions comprising relay means having a normally open and a normally closed circuit completing position connected to one conductor in said circuit adjacent said elements, the energizing current of said relay means being greater than the total current of the first of said elements connected at one terminal to said normally closed circuit completing relay position and less than the total current of the second of said elements connected at one terminal to said normally open circuit completing relay position, circuit means connecting the other terminal of each of said elements to the other conductor in said circuit, a gas discharge device connected in parallel to said first element, and means for varying the potential of said source from below to above the firing potential of said discharge device for energizing said relay to open said normally closed circuit completing position and close said normally open circuit completing position for substitution of said second element for said first element.

8. In a well fluid logging system the combination comprising a housing adapted for travel through a well bore, cable means including a tension member and a two conductor circuit extending from said housing to the earth's surface, two electrodes and relay means having a normally open circuit position and a normally closed circuit position connected in series and to said two conductor circuit, a flow responsive device connected to one of said conductors in an electrical current controlling relation for varying said current in response to variations in flow of said fluid and to said relay means at said open circuit position, means connecting the other of said conductors to said relay means, and a gas discharge device connected parallel to said electrodes to shunt said electrodes and actuate said relay when potentials higher than the firing potential of said discharge device are applied to said two conductor circuit thereby to close a circuit to said flow responsive device through said relay means to said two conductors and to concurrently open the circuit through said relay to said electrodes.

9. In a well fluid logging device, the combination comprising a housing, cable means including a two conductor circuit and tension means extending from said housing to the earth's surface, two electrodes and relay means having an open circuit and a closed circuit position connected in series and to said two conductor circuit, fluid heating means connected to one of said conductors and to said relay means in an open circuit relation, means for connecting the other of said conductors to said closed circuit position on said relay, temperature sensitive means adjacent said heating means, an amplifier connected in parallel to said heating means and responsive to said temperature sensitive means, and a gas discharge device connected parallel to said electrodes to shunt said electrodes and actuate said relay when potentials higher than the firing potential of said discharge device are applied to said two conductor circuit thereby to connect said heating means and said amplifier through said relay in closed circuit relation.

10. In a system for measuring the flow of fluid in a well bore comprising a two-conductor circuit which includes a source of current and two conductors extending from the surface of the earth into a well bore, a fluid heater positioned in intimate heat transfer relation to the fluids in said well bore, a dummy load, means for connecting a first conductor of said two-conductor circuit to a first terminal of said fluid heater and to a first terminal of said dummy load, a stepping switch having two circuit completing positions connected to the second terminals of said heater and of said dummy load, respectively, relay means connected to the second conductor of said two-conductor circuit and in circuit with said stepping switch for alternately connecting said heater and said dummy load to said second conductor for current flow therethrough, the combination therewith which comprises a pair of electrodes positioned in the region of said heater for contacting said fluid and connected in series between said stepping switch and said first conductor, a gas discharge tube connected across said electrodes having a firing potential not exceeding the potential of said first source, a second source at the surface of the earth whose potential is less than the firing potential of said gas discharge tube, means including temperature responsive means adjacent said heater for measuring flow of said fluids in dependence upon heat transfer through said fluids upon energization of said heater or said dummy load from said first source when said tube is fired, and means for substituting said second source for said first named source in said two-conductor circuit whereby said tube is extinguished and the conductivity of fluids may be measured through said electrodes and whereby said tube is fired upon reinsertion of said first named source for actuation of said stepping switch for alternate connection to said heater and dummy load.

References Cited in the file of this patent
UNITED STATES PATENTS

| | | |
|---|---|---|
| 2,517,455 | Waters | Aug. 1, 1950 |
| 2,580,182 | Morgan et al. | Dec. 25, 1951 |